US012290808B2

(12) United States Patent
Doungmene et al.

(10) Patent No.: US 12,290,808 B2
(45) Date of Patent: May 6, 2025

(54) METHOD FOR CLEANING AND/OR REGENERATING A GLASS MICROFLUIDIC SENSOR FOR THE ANALYSIS OF METALS

(71) Applicant: KLEARIA, Valbonne (FR)

(72) Inventors: Floriant Doungmene, Nice (FR); Lisa Gautrin, Cagnes sur Mer (FR); Clément Nanteuil, Cagnes sur Mer (FR)

(73) Assignee: KLEARIA, Valbonne (FR)

( * ) Notice: Subject to any disclaimer, the term of this patent is extended or adjusted under 35 U.S.C. 154(b) by 902 days.

(21) Appl. No.: 17/280,631

(22) PCT Filed: Sep. 27, 2019

(86) PCT No.: PCT/EP2019/076253
§ 371 (c)(1),
(2) Date: Mar. 26, 2021

(87) PCT Pub. No.: WO2020/065042
PCT Pub. Date: Apr. 2, 2020

(65) Prior Publication Data
US 2022/0040692 A1    Feb. 10, 2022

(30) Foreign Application Priority Data
Sep. 28, 2018   (FR) ...................................... 1858991

(51) Int. Cl.
*B01L 3/00*      (2006.01)
*G01N 27/38*     (2006.01)

(52) U.S. Cl.
CPC ........ *B01L 3/502715* (2013.01); *G01N 27/38* (2013.01); *B01L 2200/027* (2013.01); *B01L 2300/0645* (2013.01)

(58) Field of Classification Search
None
See application file for complete search history.

(56) References Cited

U.S. PATENT DOCUMENTS 8,747,604 B2    6/2014  Gosnet-Haghiri et al.
2016/0367985 A1* 12/2016 Delamarche ...... H01J 37/32009

FOREIGN PATENT DOCUMENTS

CN    103558269 B    12/2015
CN    108548860 A     9/2018
(Continued)

OTHER PUBLICATIONS

Rapport De Recherche Internationale issued in corresponding International Patent Application No. PCT/EP2019/076253 dated Nov. 8, 2019.
(Continued)

*Primary Examiner* — Lore R Jarrett
(74) *Attorney, Agent, or Firm* — Troutman Pepper Locke LLP

(57) ABSTRACT

The object of the present invention is a microfluidic method for cleaning and/or regenerating at least one microfluidic sensor comprising at least one glass microchannel forming a microfluidic circuit and at least two electrodes, comprising at least the following steps of cleaning the microfluidic circuit, comprising at least the circulation of a fluid sample in the microchannel; and step of cleaning the microfluidic circuit, comprising at least the circulation of a nitric acid solution in the microchannel.

6 Claims, 1 Drawing Sheet

(56) References Cited

FOREIGN PATENT DOCUMENTS

| EP | 2 576 056 B1 | 3/2018 | |
|---|---|---|---|
| KR | 2013 014032 A | 12/2013 | |
| WO | WO-2017027477 A1 * | 2/2017 | ........ B01L 3/502707 |

OTHER PUBLICATIONS

Rapport De Recherche Preliminaire issued in corresponding French Patent Application No. 1858991 dated Mar. 20, 2019.
Fischer, L. M., et al. "Gold cleaning methods for electrochemical detection applications" Microelectronic Engineering 86:1282-1285 (2009) cited in ISR & FR SR.
Han, K. N., et al. "On-chip electrochemical detection of bio/chemical molecule by nanostructures fabricated in a microfluidic channel" Sensors and Actuators B 177:472-477 (2013_ cited in ISR & FR SR.

* cited by examiner

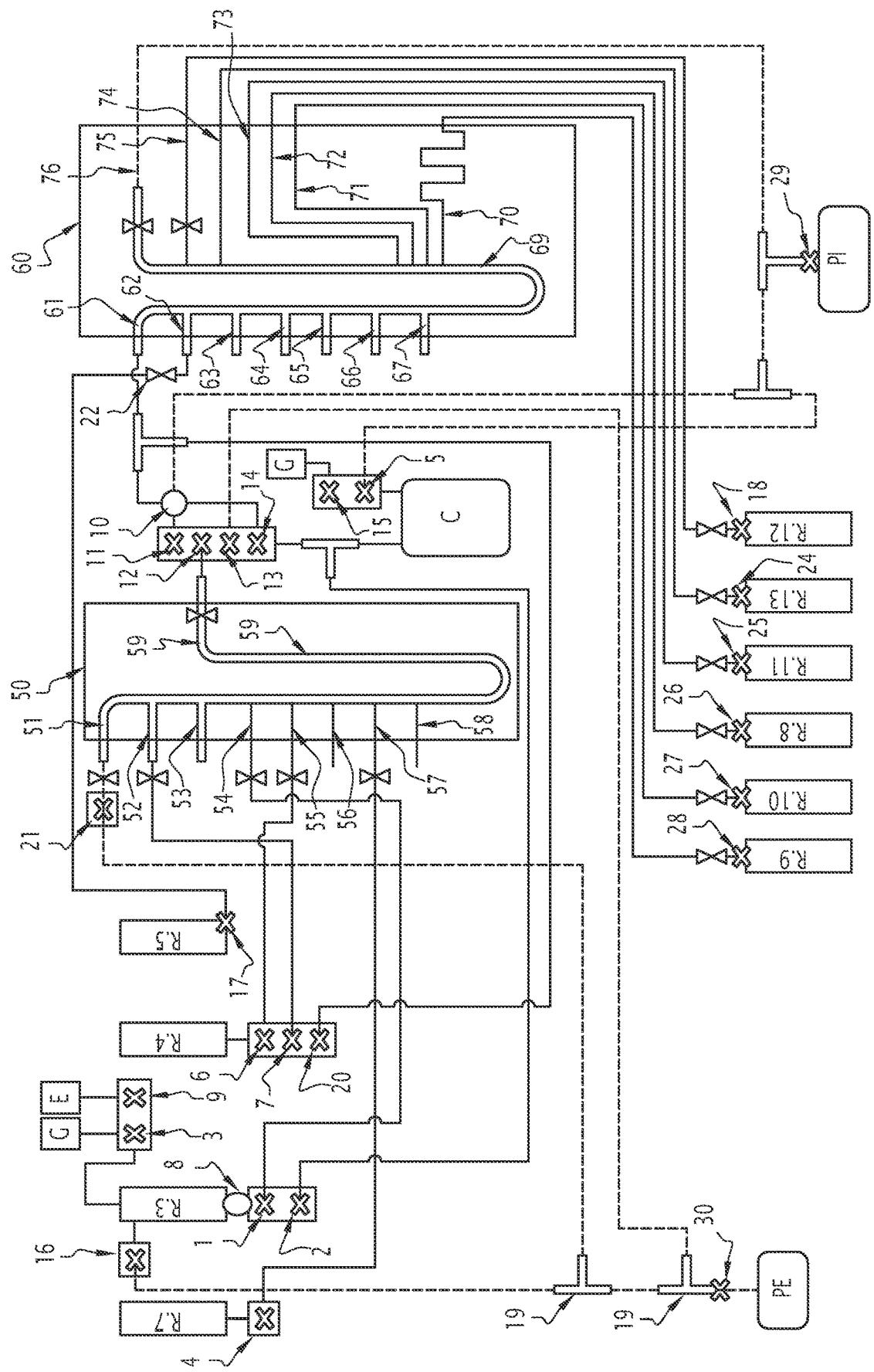

METHOD FOR CLEANING AND/OR REGENERATING A GLASS MICROFLUIDIC SENSOR FOR THE ANALYSIS OF METALS

CROSS REFERENCE TO RELATED APPLICATIONS

The present application is a U.S. National Phase Application under 35 U.S.C. § 371 of International Patent Application No. PCT/EP2019/076253, filed Sep. 27, 2019, which claims priority of French Patent Application No. 1858991, filed Sep. 28, 2018. The entire contents of which are hereby incorporated by reference.

FIELD OF THE INVENTION

The present invention concerns a microfluidic method for cleaning and/or regenerating at least one microfluidic sensor comprising at least one glass microchannel forming a microfluidic circuit and at least two electrodes, comprising at least the following steps:
  a step N) to clean the microfluidic circuit, comprising at least the circulation of a fluid sample in the microchannel; and
  a step to clean the microfluidic circuit, comprising at least the circulation of a nitric acid solution in the microchannel.

BACKGROUND

Conventional electrochemical sensors, used in particular for the detection of chemical substances, are of macroscopic size. To improve measurement sensitivity, microfluidic sensors are preferred since they have lower limits of detection (LOD) and quantification (LOQ) than conventional sensors. With microfluidic sensors, the confined aspect of the reagents within a small volume promotes fast reaction kinetics between the different species, and accelerated transfer thereof towards the electrode. Therefore, LOD values in the region of µg/L (or ppb), even ng/L (or ppt), can be reached when detecting traces of elements, in particular traces of metals.

However, such low thresholds of detection and quantification require particular attention; in particular, one constant concern is to remove every amount of substance, even minimal, from the analysis system. This, evidently, is to prevent distortion of measurement results.

The elements requiring particular cleaning and/or regeneration chiefly include the sensors of microfluidic chips which are generally composed of at least one microchannel (forming a microfluidic circuit) and at least two electrodes.

At the current time, several types of materials are routinely used to fabricate microfluidic chips: glass and polymers (e.g. of polydimethylsiloxane type (PDMS) or Cyclic Olefin Polymer type (COC)).

Glass-based electrochemical cells use a wide variety of electrode materials (carbon, gold, platinum or semiconductive material). The choice of glass can be indicated on account of the favorable properties of this material: it has the same properties of surface stability, thermal conductivity and solvent compatibility as silicon. In addition, glass is biocompatible, chemically inert, insulating, hydrophilic and allows efficient coatings.

However, glass has the disadvantage of adsorbing some chemical species such as metals which may distort analysis results. All the more so since, in the microfluidic field, this disadvantage is heightened due to a much-increased surface/volume ratio.

PDMS electrochemical cells are very practical for research on account of low prototyping costs and the time needed to fabricate a new design. However, polymers of PDMS type have several shortcomings: deterioration can be observed after exposure to some chemical products, for example some acids, and they have a tendency to adsorb. Additionally, PDMS is subject to faster ageing making it particularly incompatible for industrial needs excluding R&D.

Low chemical resistance to acids and solvents, combined with low adherence of thin layer depositions, also limit the use of polymers for recurrent analysis needs within one same system.

There is therefore a need for a high-performing microfluidic system which is reusable, reliable and affords reproducible measurements which do not denature the sample (no contamination).

The Applicant has now developed a particular method for cleaning a glass microfluidic sensor which provides efficient cleaning so that it can be reliably reused without contamination. Said method therefore allows the overcoming of issues related to the use of glass, whilst benefiting from the advantages thereof.

SUMMARY

It is therefore the object of the invention to propose a method for cleaning and/or regenerating a microfluidic sensor, which is simple, of rapid implementation and efficient.

In particular, it is the objective of the invention to clean and/or regenerate a microfluidic sensor which is used in particular for the detection of a metal trace element (MTE), particularly arsenic, in a fluid. The method of the invention particularly allows efficient cleaning of the microfluidic sensor and does not denature the inserted and tested fluid samples.

A further object of the invention is to provide a microfluidic circuit allowing the implementation of said method.

The invention therefore relates to a microfluidic method for cleaning and/or regenerating at least one microfluidic sensor comprising at least one glass microchannel forming a microfluidic circuit and at least two electrodes, comprising at least the following steps:
  a step N) to clean the microfluidic circuit, comprising at least the circulation of a fluid sample in the microchannel; and
  a step to clean the microfluidic circuit, comprising at least the circulation of a nitric acid solution in the microchannel.

By microfluidic sensor, it is meant a sensor composed of at least two electrodes, preferably at least three electrodes; and of at least one glass microchannel, said glass microchannel forming a microfluidic circuit. Each electrode can be any electrode able to be used in electrochemistry such as a gold electrode optionally coated with gold nanoparticles; a thin layer electrode; a carbon nanotube electrode; or else an electrode formed in situ by electrodeposition.

Preferably, the method of the invention, as step N), comprises at least two, preferably at least three, preferably the four following sub-steps, and including at least sub-step N1:

N1: a sub-step to clean the microfluidic circuit, comprising the injection and circulation of the fluid sample in the microchannel;
N2: a sub-step to clean the microfluidic sensor, preferably at least one electrode, in particular the gold electrode; and/or
N3: a deposition sub-step on at least one electrode, preferably via electrochemical route; and/or
N4: a control sub-step, in particular by measuring a control solution.

This method can be implemented particularly easily, in a single microfluidic circuit in which the different steps are carried out. This circuit is illustrated in FIG. 1.

The method according to the invention is preferably fully automated and allows the user to dispense with the various electrode pre-treatment steps which are sometimes complex and require the handling of chemical products such as concentrated acids.

"Fluid" means any liquid body capable of assuming the shape of the container in which it is contained. Preferably, the fluid according to the invention is a solution. Preferably, the fluid according to the invention is water.

The term "metal trace element", also called "MTE", means a metal that is toxic or toxic above a certain threshold. Preferably, the MTE is selected from lead, mercury, arsenic, copper, zinc, and cadmium. Preferably, the MTE according to the invention is arsenic.

Preferably, the method of the invention is a method for cleaning and/or regenerating a microfluidic sensor used for MTE detection, arsenic in particular, contained in a fluid such as water.

Preferably, it is implemented using a portable device including the microfluidic circuit. Preferably this device is automated and can be used in situ.

Preferably, the microfluidic circuit concerned by the method of the invention comprises at least one glass microfluidic chip (called analytical chip). An example of said chip is illustrated by the analytical chip 60 in FIG. 1.

The microfluidic circuit preferably comprises a microchannel, also called «main microchannel», and at least two, preferably at least three, preferably at least four microchannels fluidly connected to the main microchannel.

More preferably, the microfluidic circuit comprises a microchannel fluidly connected:
   to a first end, to an inlet (in particular for injection of the sample) and to at least one reservoir for nitric acid; and
   to the second end, to at least two reservoirs for reagents to regenerate at least one electrode.

The main microchannel (which is in glass) comprises at least two electrodes, preferably at least three electrodes, which are:
   a working electrode, preferably in gold;
   a reference electrode, preferably in platinum; and
   a counter electrode, preferably in platinum.

Preferably, the microfluidic circuit is a circuit for the analysis of a fluid, in particular suitable for the implementation of the method according to the invention, comprising:
   at least one storage reservoir for reagent(s), preferably nitric acid and L-cysteine, and optionally at least a second storage reservoir comprising at least one standard solution;
   at least one first microfluidic chip, known as a premixing chip, comprising at least one first fluidly connected microchannel:
      at a first end, to both reservoirs and to an inlet, and
      at the second end, to a reservoir,
   the said inlet suitable for injection of a sample of fluid to be analyzed; and
      at least a second microfluidic glass chip, called an analysis chip, comprising at least a second microchannel fluidly connected:
         to a first end, to an inlet (in particular for injection of the sample) and to at least one reservoir for nitric acid; and
         to the second end, to at least two reservoirs for reagents to regenerate at least one electrode.

The first chip and the second chip according to the invention can also, according to an embodiment, be prepared on a single substrate. In such a case, a single chip is thus obtained, comprising a first compartment (corresponding to the premixing chip) and a second compartment (corresponding to the analysis chip).

Preferably, the microfluidic circuit comprises, in the first chip, a first microchannel array in which the fluid sample to be analyzed and the reagents (such as nitric acid and L-cysteine) circulate; and in the second chip, a second microchannel array comprising at least 2 electrodes, preferably at least 3 electrodes.

Preferably, the first microchannel array is present in a first microfluidic chip, usually called a "pre-treatment chip" or "mixing chip", which is used to mix the different reagents (such as nitric acid and L-cysteine) with the sample, especially in specific proportions.

Preferably, the second microchannel array is present in a second microfluidic chip, generally referred to as the "analysis chip"; this is the chip on which the detection and quantification of target pollutants is carried out, thanks to the presence of the two or three electrodes, and in particular also thanks to the presence of calibration solutions (or standard solutions).

The circuit according to the invention, integrated in particular in chips as described above, allows the implementation of the method described above, in a particularly easy way.

Microfluidic chips according to the invention are miniaturized devices for biological or chemical analysis, consisting of at least one thin plate (of the order of a few tens to a few hundred micrometers), preferably consisting of glass (i.e. a hard, brittle and transparent substance with a glassy structure, essentially formed of alkali silicates, and having a high chemical resistance), and a cover comprising at least one microfluidic channel (or microchannel). Each chip is preferably as described in EP2576056.

By glass chip, it is meant any chip that is entirely in glass, but also any chip having a glass interface between the substrate and cover lid. Said interface can be obtained for example using a glass substrate and silicon cover lid.

Preferably, the chips constituting the microfluidic circuit according to the invention (i.e., premixing chip and analysis chip) each comprising:
   a plate,
   a cover comprising at least one microchannel, and
   a single layer, intermediate between the plate and the cover, formed of an inorganic matrix of $SiO_2$.

Preferably, the single layer has a thickness between 100 nm and 10 nm, and preferably between 300 nm and 400 nm. Preferably, each chip has at least one circuit in the cover and/or at least one circuit on the cover, associated with the cover by an inorganic matrix of $SiO_2$.

The microfluidic chips according to the invention are made of glass. Indeed, when the plate and the cover of the said chip are made of glass, the chips fully benefit from the exceptional properties of glass, namely:

a high optical transparency allowing good observation;
a high mechanical strength, with a high Young's modulus and a high breaking stress (depending on the type of glass used);
low porosity, which makes the chip perfectly suited to chemical analysis applications in very low concentration conditions (analysis of low-concentration toxins, for example), avoiding any pollution from outside the chip and any leakage of hazardous products to the outside;
chemical inertness to most chemical compounds (with the exception of hydrofluoric acid derivatives), for example, such as concentrated acids and non-aqueous solvents. Therefore, various chemical solutions can be circulated through the microchannels. For example, the surfaces of the fluid channels are naturally hydrophilic as a result of the chemical treatments carried out for the manufacture of the chip. This specificity is important for the analysis of biological samples. However, if necessary, it is also possible to treat the fluid channels to make them hydrophobic by circulating a suitable solution. Finally, the chip can undergo chemical cleaning, and can be biopassivated on the surface by a simple circulation of an adapted liquid known to a person skilled in the art, to obtain at will a biocompatibility. The advantage of the chemical inertness of the chip, can be seen here;
a high electrical insulation which allows in particular a correct functioning of the circuits and the application of strong external electric fields (as in the case of capillary electrophoresis on the chip for example).

Glass microfluidic chips are preferred for electrochemical/optical detection on account of the properties of glass, instead of polymers such as PDMS. Preferably, for the analysis of metal traces, the glass should be properly cleaned since it has a tendency to adsorb metals.

In addition, preferably, when the glass chip of the invention is not in use, it must not be left dry to prevent irreversible adsorption of metals on the glass walls and on the electrodes. It can be filled with a liquid which allows dissolving of potential contaminant residues remaining after cleaning. Depending on the liquid used, the constituent materials of the electrodes might oxidize or evolve towards another surface condition which would modify the electrochemical properties of the circuit. In particular, the reference electrode is highly sensitive to chemical surface condition; its potential must therefore remain stable.

Preferably, the circuit is stored under water or nitric acid, preferably nitric acid at a concentration of 1M or higher, preferably a concentration of 1 M or 2.2 M, when not in use. Storage under nitric acid is particularly efficient: under these conditions the reference electrode in platinum stored with nitric acid affords a very stable surface potential.

Therefore, preferably, the method of the invention comprises a step to store the circuit under nitric acid.

The present invention will be better understood by reading the following description of preferred embodiments, given for illustrative and non-limitative purposes, and accompanied by FIG. 1, which is a plan, in top view, having a circuit comprising the microfluidic chips allowing the implementation of a method according to the invention.

BRIEF DESCRIPTION OF DRAWING

Microfluidic Circuit

FIG. 1 is a plan, in top view, of a circuit comprising the microfluidic chips allowing the implementation of a method according to a preferential embodiment of the invention. Preferably, this circuit comprising the microfluidic chips is suitable for the detection of arsenic in a fluid sample such as water. This plan shows the different microchannels that are provided within this circuit.

DETAILED DESCRIPTION

This circuit generally consists of the following elements:
the reservoirs (R.3, R.4, R.5, R.7 and R.8 to R.13): their role is to store the different reagent solutions and the sample to be analyzed.

In particular, the reservoir R.3 contains the sample to be analyzed.

Typically, the reservoir R.4 is used to store nitric acid ($HNO_3$), preferably of 2.2 M concentration. The nitric acid has a double role: as mentioned above, it cleans the microfluidic circuit, but also acidifies the sample to be analyzed.

Preferably, the circuit includes a reservoir R.5, which contains a mixture of the nitric acid (especially at 100 mM) and L-cysteine (especially at 15 mM): it serves as a measurement blank, or control solution. In other words, the reservoir R.5 contains a sample devoid of MTE, which serves as a control. It is used to check that the circuit has not been contaminated by the sample to be analyzed.

The reservoir R.7 contains L-cysteine, preferably at 50 mM.

The reservoirs R.8 to R.11 preferably contain calibration solutions. In particular, they contain As(III) solutions of respective concentrations equal to 14.48, 28.96, 72.40 and 144.80 ppb, acidified with 10 mM nitric acid. These solutions are used to make additions of 2 and 4 ppb As(III), or 10 and 20 ppb As(III), to the sample to be analyzed (by definition of unknown concentration), which depends on the concentration to be analyzed. For a range of concentrations to be analyzed between 0 and 10 ppb, the addition of 2 and 4 ppb solutions are used, while additions of 10 and 20 ppb solutions are used for concentrations greater than 10 ppb.

Preferably, the reservoir R.12 contains an aqueous solution of sulfuric acid ($H_2SO_4$), preferably at 100 mM. It allows in particular the cleaning of the working electrode of the analysis chip, by an electrochemical way between different measurements.

Finally, the reservoir R.13 preferably contains a mixture of tetrachloroauric acid ($HAuCl_4$), preferably at 2 mM, and sulfuric acid ($H_2SO_4$), preferably at 100 mM.

This solution is used for automatic electrochemical regeneration of the working electrode (especially gold) of the analysis chip in case its surface deteriorates.
the internal (IWB) and external (EWB) waste bins:
The external waste bin contains the excess sample to be analyzed that has been injected into the system, or that has been used to rinse the reservoir R.3.

The internal waste bin (waste bin with gas-permeable cover), which is inaccessible to the user, contains all the solutions containing chemicals, such as acid solutions, L-cysteine solution or the mixture of tetrachloroauric acid and sulfuric acid.
the reservoir (C):
This is a recirculating reservoir with one inlet and one outlet. It is used to heat the sample to be analyzed, in the presence of L-cysteine, and thus carry out the conversion from As(V) to As(III). This heating is typically performed by a heating resistor mounted on the reservoir.
the debubblers (references 8 and 10 on FIG. 1):
The debubblers are indicated in a circle on FIG. 1. There is one between the reservoir R.3 and the solenoid valve 1

(debubbler 8); and another at the outlet of the solenoid valve 14 (debubbler 10). They are used to remove air or gas bubbles trapped in the liquid circulating in the circuit.

The solenoid valves (SVs), shown by crosses in FIG. 1:

These are electrically controlled systems, which allow the passage or not of the liquid in the circuit. Thus, when a solenoid valve is open, it will allow the liquid to pass through, while when it is closed the liquid is blocked and cannot pass through.

the connection elements (tubes, screws, unions, ferrules), shown by an hourglass as the reference 22 in FIG. 1:

These are the different elements that allow to connect the different parts of the circuit. The liquid can thus circulate in all the circuit.

a gas bottle (G):

A one liter bottle at 12 bars of nitrogen is used to generate a pressure to move the different solutions in the system. Preferably, a positive pressure of 500 mbar is used throughout the analysis. This bottle is connected to the circuit via the solenoid valve 3, which allows the gas to be injected into the circuit.

the microfluidic chips (50 and 60):

pre-treatment chip or mixing chip (reference 50 in FIG. 1):

It allows a pre-treatment of the sample, making the different mixtures in the desired proportions. The user is thus freed from these steps, which are often long and require the handling of dangerous reagents, such as concentrated acids.

It is delimited, in FIG. 1, by the inlets 51 to 58, the inlet 51 being connected to the solenoid valve 21; and by the outlet of the main microchannel 59 (also called "first microchannel") on the solenoid valve 12. The main microchannel 59, also called "first microchannel", is the microchannel starting at the inlet 51 and ending at the solenoid valve 12.

Specifically, the inlet 51 is connected to the external WB via the solenoid valve 21.

The inlet 52 is connected to the reservoir R.4 (containing the nitric acid) via the solenoid valve 7.

The inlets 53, 56 and 58 are not connected. They can be used in the following cases in particular: one inlet is provided for the addition of a complexing agent, such as EDTA, to complex the metal interference potentials; another inlet is provided for diluting the sample with water, especially ultrapure water, if the sample is highly concentrated and outside the linearity range of the sensor; finally, the last inlet is suitable for a more concentrated nitric acid solution, which would be used in case of dilution, in order to bring the final pH to an acceptable value, e.g. 1.

The inlet 54 is connected to the reservoir R.3 (containing the sample to be analyzed) via the solenoid valve 1.

The input 55 is connected to the reservoir R.4 (containing nitric acid) via the solenoid valve 6.

Finally, the inlet 57 is connected to the reservoir R.7 (containing L-cysteine) via the solenoid valve 4.

This chip 50 has a channel depth of 50 μm. Typically, the length between the inlet 51 and the outlet 59 is 142 mm.

The main microchannel 59 has a width typically between 0.7 and 2 mm, preferably between 0.7 and 1.5 mm, preferably 1 mm.

The flow rate of the main microchannel is preferably 11 ml/h at a pressure of 500 mbar.

Preferably, the dimensions of the different channels of the pre-treatment chip are as follows:

| Inlet | Channel length (in mm) | Channel width (in mm) |
|---|---|---|
| 51 | 15 | 1 |
| 52 | 15 | 1 |
| 53 | 15 | 0.404 |
| 54 | 15 | 0.400 |
| 55 | 144 | 0.285 |
| 56 | 15 | 0.380 |
| 57 | 36 | 0.276 |
| 58 | 36 | 0.391 |
| Outlet 59 | 15 | 1 |

Preferably, the dimensions of the different channels are chosen so that at the outlet of the main microchannel of the chip, the mixtures are homogeneous and in the proportions below:

|  | Normalized V |
|---|---|
| V(sample) | 0.63 |
| V(HNO3 2.2M) | 0.04 |
| V(L-Cysteine 50 mM) | 0.32 |
| V total | 1.00 |
| Sample dilution | 1.58 |

Preferably, the dimensions of the mixing chip 50 are such that for a total normalized volume leaving the chip (equal to 1), the volume of the sample to be analyzed is 0.63, the volume of nitric acid is 0.04 and the volume of L-cysteine is 0.32. In this case, we have a sample dilution of 1.58 (=1/0.63).

analysis chip 60:

This chip 60 comprises a three-electrode system, on which the mixtures leaving the pre-treatment chip 50 are analyzed.

The analysis chip 60 is delimited, in FIG. 1, by the inlets 61 to 67, with the inlet 61 being connected to a debubbler 10 and the solenoid valve 14; by the inlets 70 to 75; and by the outlet of the main microchannel 69 (also called the "second microchannel") in the internal WB.

The main microchannel 69 has a width typically between 0.7 and 2 mm, preferably between 0.7 and 1.5 mm, preferably equal to 1 mm.

The analysis chip 60 typically has 13 inlets (references 61 to 67 and 70 to 75) and one outlet 76. These inlets include inlets 70 to 75 connected to the reservoirs R.8 to R.13, and the inlets 61 to 67.

The inlet 61 is connected to a debubbler 10, the solenoid valve 14 and the reservoir R.4 (containing nitric acid) via the solenoid valve 20.

The inlet 62 is connected to the reservoir R.5 (containing the measurement blank) via the solenoid valve 17.

The inlets 63 to 67 can be connected to ultrapure water reservoirs and/or for the addition of buffer solutions, such as acetates or phosphates. They allow measurements to be carried out on highly concentrated samples, or at pH values close to the pH value of drinking water, i.e., without acidification.

In addition, the reservoirs R.8 to R.11 (containing the calibration solutions) are connected to the main microchannel 69 via the solenoid valves 26, 28, 27 and 25 respectively.

The reservoir R.12 (containing the aqueous sulfuric acid solution) is connected to the main microchannel 69 via the solenoid valve 18.

Finally, the reservoir R.13 (containing the mixture of tetrachloroauric acid and sulfuric acid) is connected to the main microchannel 69 via the solenoid valve 24.

In detail, preferably, the three-electrode system includes:
a gold working electrode with a size of 1.06 mm×1 mm,
a platinum reference electrode with a size of 2.96 mm×1 mm, and
a platinum counter-electrode with a size of 6.74 mm×1 mm,
all electrodes being located in the main microchannel 69 (not shown in FIG. 1).

The depth (or width) of the analysis chip 60 is 20 µm. The length between the inlet 61 and the outlet 76 is typically 178 mm, and the width of the main microchannel 69 is 1 mm.

Preferably, the average outlet flow rate is about 400 µl/h at a pressure of 500 mbar.

Typically, the sample from the pre-treatment chip enters through one of the channels of the pre-treatment chip, for example, the inlet 61, as does the nitric acid from the reservoir R.4.

Another channel (i.e., the inlet 62 via the solenoid valve 17) is dedicated to measuring the blank (reservoir R.5) (control solution), which serves as a control to ensure that there is no contamination from the system or from the previous sample.

The dimensions of the different channels of the analysis chip necessary to obtain the ratios allowing a satisfactory LOD are as follows:

| Inlet | Channel length (in mm) | Channel width (in mm) |
|---|---|---|
| 61 | 10 | 1 |
| 62 | 10 | 0.862 |
| 63 | 10 | 0.748 |
| 64 | 10 | 0.190 |
| 65 | 10 | 0.622 |
| 66 | 10 | 0.446 |
| 67 | 10 | 0.344 |
| 70 | 50 | 0.152 |
| 71 | 50 | 0.150 |
| 72 | 52 | 0.150 |
| 73 | 54 | 0.150 |
| 74 | 10 | 1 |
| 75 | 10 | 1 |
| 76 | 10 | 1 |

Typically, each chip (pre-mixing chip and/or analysis chip) can be composed of two superimposed plates, glued together. Thus, each chip can be composed of a first plate, which can for example be a transparent microscope slide, and a second plate whose face in contact with the first plate is engraved so as to define microchannels between the two plates which are superimposed and glued to each other. The first plate can be made of a polymer material. The material constituting at least one of the two plates may be transparent. The dimensions of the microchannels are determined by adapting the width and depth of the engravings in the engraved plate. It should be noted that microfluidic chips manufactured according to other methods known to the man skilled in the art can obviously be used to implement the invention.

As a complement to the elements mentioned above, the microfluidic circuit according to the invention can be connected especially to at least one element chosen among an electronic device necessary for the operation of the system, a battery, a potentiostat for piloting the electrochemical measurements, a cooling system placed on the chips to cool the solutions coming from the reservoir and a screen, in particular a touch screen, which makes it possible to launch the desired measurement, to know the state of progress of the measurement and to visualize the result obtained.

Microfluidic Method for Cleaning and/or Regeneration

As previously indicated, the invention relates to a microfluidic method for cleaning and/or regenerating at least one microfluidic sensor comprising at least one glass microchannel forming a microfluidic circuit and at least two electrodes, comprising at least the following steps:
a step N) to clean the microfluidic circuit, comprising at least the circulation of a fluid sample in the microchannel; and
a step to clean the microfluidic circuit, comprising at least the circulation of a nitric acid solution in the microchannel.

As indicated above, preferably the glass microchannel is fluidly connected:
to a first end, to an inlet (in particular for injection of the sample) and to at least one reservoir for nitric acid; and
to the second end, to at least two reservoirs for reagents to regenerate at least one electrode.

Preferably, the microfluidic sensor concerned by the method of the invention comprises at least three electrodes which are:
a working electrode, preferably in gold;
a reference electrode, preferably in platinum; and
a counter electrode, preferably in platinum.

Preferably, the method of the invention, as step N), comprises at least two, preferably at least three, preferably the four following sub-steps, and including at least sub-step N1:
N1: a sub-step to clean the microfluidic circuit, comprising the injection and circulation of the fluid sample in the microchannel;
N2: a sub-step to clean the microfluidic sensor, preferably at least one electrode in particular the gold electrode;
N3: a deposition sub-step on at least one electrode, preferably via electrochemical route; and/or
N4: a control sub-step, in particular by measuring a control solution.

Preferably, the method of the invention, as step N), comprises at least two, preferably at least the three following sub-steps, and including at least sub-step N1:
N1: a sub-step to clean the microfluidic circuit, comprising the injection and circulation of the fluid sample in the microchannel;
N2: a sub-step to clean the microfluidic sensor, preferably at least one electrode, in particular the gold electrode; and/or
N3: a deposition sub-step on at least one electrode, preferably via electrochemical route.

Preferably, sub-step N3 comprises the deposition of at least one conductive or semiconductive layer on at least one electrode. The conductive or semiconductive layer can be obtained using any conductive or semiconductive material, for example using a metal such as gold, a conductive polymer or a conductive or semiconductive oxide.

Preferably sub-step N3 comprises the deposition of metal on at least one electrode. Preferably, sub-step N3 comprises the deposition of gold on at least one electrode such as the working electrode. Preferably, deposition is performed via electrochemical route. In particular, when the microfluidic sensor comprises a working electrode in gold, sub-step N3 comprises the deposition of gold on the working electrode via electrochemical route, using as reagents a mixture of tetrachloroauric acid and sulfuric acid.

Preferably, the method of the invention, as step N), comprises at least the following sub-steps:
- N1: a sub-step to clean the microfluidic circuit, comprising the injection and circulation of the fluid sample in the microchannel;
- N2: a sub-step to clean at least the gold electrode, by injection and circulation of sulfuric acid in the microchannel; and
- N3: a sub-step to deposit gold on the gold electrode via electrochemical route, with a mixture of tetrachloroauric acid and sulfuric acid.

Preferably, sub-step N1 (cleaning of the microfluidic circuit) comprises the injection and circulation of the sample in the main microchannel.

Preferably, it is performed as follows:

The solenoid valves 1, 21 and 30 are open. The sample inlet channel in the pre-treatment chip 50 (inlet 54 of the pre-treatment chip) is cleaned with the sample, then the sample fraction used for cleaning is returned to the external waste bin, in particular through the solenoid valves 21 and 30. This operation typically lasts about 30 seconds, after which the solenoid valves are closed.

Then, the solenoid valves 2, 5 and 29 are opened. The sample is pushed towards the reservoir especially through the solenoid valve 2, and then into the internal waste bin, especially through the solenoid valves 5 and 29. This operation typically lasts 30 seconds and then the solenoid valves are closed.

Then the reservoir is emptied, in particular through solenoid valves 15, 13 and 30. The solenoid valve 15 sends the gas G (as with solenoid valve 3) into the reservoir; the gas then exerts pressure on the liquid contained in the reservoir and pushes it towards the external waste bin, in particular by means of the solenoid valves 13 and 30. This operation typically lasts 15 seconds, then the solenoid valves are closed.

Preferably, sub-step N2 comprises the injection and circulation of an acid, preferably sulfuric acid, in the main microchannel. This acid allows cleaning of the microfluidic sensors containing the measurement electrodes, in particular the gold electrode. The method particularly used is cyclic voltammetry. Preferably, sub-step N2 comprises the use of sulfuric acid in the microchannel to clean at least one electrode by cyclic voltammetry.

Preferably, sub-step N2 also comprises measurement of the active surface of the electrode, to verify that it still remains equal to a target value, in particular +/−10%.

Preferably, it is conducted as follows:

Noble metals such as gold, platinum and silver are very often used as working electrode. In this case, it is preferable to clean it before any measurement, in order to eliminate oxides potentially formed on its surface over time, or to eliminate traces of MTE (arsenic in particular) remaining on the electrode from the previous measurement.

For this purpose, sulfuric acid (contained in the reservoir R.12) is used to clean the gold electrode present in the main microchannel 69 of the analysis chip 60, in particular by cyclic voltammetry (voltammetry). The solenoid valves 18 and 29 are open to let this acid through. Cycling is typically performed between −0.4 and 1.5 V at 200 mV/s. This operation usually lasts 3 minutes, then the solenoid valves are closed.

Therefore, preferably, the method of the invention, as step N), comprises at least the following sub-steps:
- N1: a sub-step to clean the microfluidic circuit, comprising the injection and circulation of a fluid sample in the microchannel; and
- N2: a sub-step to clean at least one electrode, sub-step N2 comprising the use of sulfuric acid in the microchannel to clean at least one electrode by cyclic voltammetry, and comprising measurement of the active surface of the electrode to verify that it still remains equal to a target value, in particular +/−10%.

Preferably, whenever necessary, sub-step N3 comprises the deposition particularly of metal on at least one electrode, preferably the gold electrode, via electrochemical route. In particular, sub-step N3 is performed when the active surface of the electrode (such as measured in particular at sub-step N2) is lower than its target value.

Preferably, for this purpose, as reagents a mixture is used of tetrachloroauric acid and sulfuric acid. This mixture is released into the main microchannel, and deposition of gold is obtained by chronoamperometry, for example for about 300 seconds, at the peak potential for deposition of Au(III) on the working electrode.

The objective of this sub-step N3 is to increase the electrochemically active metal surface (preferably gold) obtained by vacuum electrochemical deposition. Indeed, when measurements are taken at highly oxidizing potentials (potential close to the dissolution potential of the electrode metal) or in the presence of some species such as chloride ions possibly promoting dissolution of the electrode metal, it is important to set up an automatic regeneration system of the electrode material.

The measuring surface will then no longer be flat, but in relief (in 3D), because the electrochemical deposition leads to a non-planar surface. To do this, generally the solenoid valves 24 and 29 are opened for about 3 minutes, the mixture of tetrachloroauric acid and sulfuric acid from the reservoir R.13 is then released in the inlet 74 and then in the main microchannel 69, and the gold deposit is made by chronoamperometry for about 300 seconds at the peak potential of Au(III) deposit on the working electrode. This potential is determined by cyclic voltammetry. Gold deposition can also be achieved when after a certain number of measurements, the active gold surface is reduced, resulting in a reduction of the peak area of gold oxide reduction by cyclic voltammetry measurement. In this case, the system automatically initiates a gold deposit for regeneration.

Once deposition is completed, the reducing surface area of the gold oxides is again measured; if it is equal to the target value +/−10%, then deposition is automatically halted, otherwise it continues until the target range is reached.

Preferably, sub-step N4 is carried out as follows:

Measuring the control solution (blank) can be carried out to check the cleanliness of the previously cleaned circuit. For this purpose, solenoid valves 17 and 29 are usually open for about 5 minutes. The analysis of the blank (control solution) (contained in reservoir R.5) is typically done by SWV (Square Wave Voltammetry).

The content of the reservoir R.5 is released into inlet 62 and then into the main microchannel 69, to be measured, before being disposed of in the internal waste bin.

The analysis of the blank is done with a deposition potential (Edep) of −1.1 V, for 90 seconds (Tdep), with an amplitude of 0.02 V. The signal is recorded between −0.2 and 0.7 V. If a peak appears, then the sub-steps N1 to N3 are restarted, preferably automatically, otherwise one proceeds to the step b) of the method according to the invention.

The method of the invention also comprises a step to clean the microfluidic circuit, comprising at least the rinsing of the sensor microchannel with nitric acid.

Typically, after analysis, the solenoid valves 7, 12, 5 and 29 are opened, in particular for 30 seconds, to clean the chamber and microchannels containing nitric acid. The nitric acid remaining in the chamber is used to clean the analytical chip 60, typically by opening solenoid valves 14, 15 and 29, for about 30 seconds. This chip is again cleaned and for storage it is filled with nitric acid, generally for 10 minutes by opening solenoid valves 20 and 29.

The cleaning and/or regenerating method of the invention can be used in a microfluidic method for analyzing a fluid containing at least one MTE, comprising the following steps:

a) inserting a fluid sample into at least one microchannel of a microfluidic circuit;

b) in the microchannel of the microfluidic circuit, mixing the fluid sample inserted at step a) with reagents; and c) measuring the amount of MTE contained in the sample obtained at b), using an electrochemical detection method with a microfluidic sensor.

Preferably, step c) is conducted using at least 2 electrodes, preferably at least 3 electrodes, preferably at least 3 electrodes of which one in gold.

Preferably, the cleaning and/or regeneration method of the invention can be used in a microfluidic method for analyzing a fluid containing arsenic, comprising the following steps:

a) inserting a fluid sample into at least one microchannel of a microfluidic circuit;

b) in the microchannel of the microfluidic circuit, mixing the fluid sample inserted at step a) with nitric acid and L-cysteine; and c) measuring the amount of arsenic contained in the sample obtained at b), using an electrochemical detection method with a microfluidic sensor.

Preferably, step c) is conducted using at least 2 electrodes, preferably at least 3 electrodes, preferably at least 3 electrodes of which one in gold.

Step a) to insert a fluid sample into at least one microchannel of a microfluidic circuit is preferably conducted with the following sub-steps:

a1) injecting the sample into the microfluidic circuit; and a2) pressurizing the sample in the circuit.

Injection of the sample into the microfluidic circuit (sub-step a1) is performed in particular by injecting said sample through the inlet of the first microchannel of the first circuit chip. In particular, this step is performed using a syringe fitted with a 0.45 µm filter. The filter allows removal of all matter in suspension having a diameter greater than 0.45 µm.

More specifically, with reference to FIG. 1, the solenoid valves 9, 16 et 30 are initially opened. Solenoid valve 9 allows the sample (E) to pass towards the reservoir R.3. Part of this sample is used to rinse the reservoir and is sent towards the external waste chamber PE through solenoid valves 16 and 30, whilst the remainder of the sample remains in the reservoir R.3 and is used for analysis.

Typically, this operation can last for several minutes or seconds, after which the solenoid valves 9, 16 and 30 are closed.

The sample is then pressurized (sub-step a2). Pressurizing of the sample can be obtained with any means, for example by injecting a gas, particularly an inert gas, or else by aspiration. For example, pressurizing can be obtained by means of a pump or syringe. With pressurizing, the sample is set in movement.

For example, the sample is stored in a reservoir (R.3) connected to a microchannel of the microfluidic circuit. Preferably, it is stored in a reservoir (R.3) connected to the first microchannel of the first chip, and pressurizing of the reservoir R.3 is obtained in particular by opening a solenoid valve (solenoid valve 3), which is connected to the supply of gaseous nitrogen (G).

Preferably, the other reservoirs, with the exception of reservoir R.3, are always under pressure throughout the entire process (i.e. before and after measurement). Solenoid valve 3 remains open throughout the time of analysis; it is closed on completion of measurement.

Between steps a) and b) of the method, the method of the invention is implemented in accordance with the procedures detailed in the foregoing.

Once the sample has been introduced, and the possible cleaning step(s) carried out, the second step (step b) follows: the mixing, within the microchannel of the microfluidic circuit, of the sample with reagents, preferably nitric acid and L-cysteine.

Typically, during this step b), the two reagents, especially present in the two reservoirs fluidly connected to one end of the first chip, are released in the first microchannel of the said first chip and mix with the sample injected into the inlet.

Preferably, the mixture obtained is then conveyed into a reservoir, preferably into the reservoir connected to the second end of the first microchannel of the first chip.

Preferably, the first microchannel of the first chip is the main microchannel (microchannel 59 in FIG. 1) and has a width typically between 0.7 and 2 mm, preferably between 0.7 and 1.5 mm, preferably equal to 1 mm; and a length typically between 30 and 60 µm, preferably between 40 and 55 µm.

Preferably, the microchannel flow rate of the first chip is 11 ml/hour at a pressure of 500 mbar.

Typically, in this step b), solenoid valves 4, 1, 5, 6, 12 and 29 are opened. The sample, nitric acid and L-cysteine are then mixed in the desired proportions using the mixing chip 50 and fed into the reservoir through solenoid valve 12. This operation usually takes a few minutes, typically 2 to 5 minutes, preferably 2 to 3 minutes, more preferably 2 minutes and 15 seconds, and then the solenoid valves are closed.

Then the connecting tubes and the reservoir are rinsed with the pre-treated sample.

Then the solenoid valves 11, 15 and 29 are opened, preferably for 15 seconds. The pre-treated sample is then sent to the internal waste bin.

The reservoir is filled again by opening solenoid valves 4, 1, 5, 6, 12 and 29, usually for a few minutes, typically 2 to 5 minutes, preferably 2 to 3 minutes, more preferably 2 minutes and 15 seconds, and then the pretreated sample is sent, this time to the analysis chip 60 by opening solenoid valves 14, 15 and 29.

Preferably, the dimensions of the different channels are chosen so that at the outlet of the main microchannel 59 of the chip 50, the mixtures are homogeneous and in specific proportions.

In particular, the mixture of sample, nitric acid (at 2.2 mM) and L-cysteine (at 50 mM) is made in a volume ratio of 0.6-0.7:0.03-0.05:0.25-0.40 respectively. Preferably, this respective volume ratio is equal to 0.63:0.04:032.

Finally, once the sample has been mixed with reagents, preferably nitric acid and L-cysteine, the method comprises a step c) of measuring the quantity of MTE present in the sample obtained in b), using at least 3 electrodes, one of which is gold.

The step c) preferably comprises circulating the sample obtained in b) from the reservoir through the second microchannel of the analysis chip, comprising at least three electrodes, one of which is gold.

Preferably, the second microchannel of the second chip (analysis chip) is the main microchannel (microchannel 69 in FIG. 1), and has a width typically between 0.1 and 2 mm, preferably between 0.12 and 1.5 mm; and a length typically between 5 and 80 mm, preferably between 9 and 60 mm.

Typically, in the step c), the sample obtained in b) (also called pre-treated sample), once in the analysis chip 60, is analyzed using at least 3 electrodes, one of which is gold.

More specifically, in the case of arsenic, during the step c), the pre-treated sample is analyzed using at least 3 electrodes, one of which is gold, and according to the following sub-steps:
  c1) measurement of the quantity of arsenic (III) present in the sample, called As(III), then
  c2) conversion of the arsenic (V) remaining in the sample to arsenic (III), then measuring the quantity of arsenic (III) obtained, called As tot, and finally
  c3) determining the amount of arsenic actually present in the sample by the formula As(V)=As tot−As(III).

First of all, the amount of As(III) is determined; this is step c1).

Preferably, this step c1) involves at least one standard solution. Preferably, the step c1) involves mixing the sample obtained in b) with at least one standard solution, preferably two standard solutions of different concentrations, and then determining the concentration of As(III) present in the sample. "Standard solution" means a solution comprising a known concentration of As(III). For example, a first standard solution with an As(III) concentration between 5 and 15 ppb and a second standard solution with an As(III) concentration between 15 and 25 ppb can be used; or a first standard solution with an As(III) concentration between 1 and 3 ppb and a second standard solution with an As(III) concentration between 3 and 5 ppb can be used.

Preferably, the quantity of As(III) is measured by circulating the sample obtained in b) by SWV, especially with the same electrochemical parameters as the control solution (blank), with the exception of Tdep (deposition time), i.e., a deposition potential (Edep) of −1.1 V, for 120 seconds (Tdep), with an amplitude of 0.02 V, and the signal is recorded between −0.2 and 0.7 V.

The average area (Amoy) of the peak measured during the desorption of arsenic on the gold electrode is compared with threshold values.

In particular:
  if $3 \times 10^{-3}$ µAV<Amoy<$3 \times 10^{-2}$ µAV, then the system opens the solenoid valves 27 and 25, which provide additive concentrations (standard solutions) in the mixture of 10 and 20 ppb respectively (i.e., reservoirs R.10 and R.11). At each addition, the Amoy (addition) is measured. Thus, the values of Amoy, Amoy (addition1) and Amoy (addition2) are used to determine the concentration of As(III) in the sample;
  if Amoy<$3 \times 10^{-3}$ µAV, then the measurement of Amoy is repeated using a deposition time of 360 seconds. In this case, if the resulting signal gives an Amoy<$3 \times 10^{-4}$ µAV, then the sample contains As(III) in a concentration below the limit of quantification of 0.85 ppb. Conversely, if Amoy>$3 \times 10^{-4}$ µAV, then the system opens the solenoid valves 26 and 28, which provide additive concentrations in the mixture of 2 and 4 ppb respectively (i.e., reservoirs R.8 and R.9). At each addition, the Amoy (addition) is measured. Thus, the values of Amoy, Amoy (addition1) and Amoy (addition2) are used to determine the concentration of As(III) in the sample;
  if Amoy>$3 \times 10^{-2}$ µAV, the sample is automatically diluted at the pre-treatment chip 50, depending on the measured Amoy. Then a Tdep of 360 seconds or 120 seconds is applied.

Then the amount of As(V) is determined; this is step c2).

The measurement of As(V) is obtained indirectly by subtracting the real As(III) content from the total arsenic content (As tot) (i.e., As(V)=As tot−As(III)). The total arsenic (As tot) is obtained by converting all As(V) to As(III).

To convert arsenic (V) to arsenic (III), preferably an incubation step of the sample obtained in b) takes place in the reservoir, preferably by heating. Typically, this incubation step is carried out for a few minutes.

For this purpose, when the mixture is in the reservoir, the solenoid valves are closed and the reservoir is heated with the heating resistor, for example, for 10 minutes. In this way, all the As(V) is transformed into As(III), which, combined with the As(III) already present in the sample, gives the total amount of arsenic. This mixture is then fed into the analysis chip 60 as previously described (i.e., by opening the solenoid valves 14, 15 and 29), to be dosed. The analysis chip 60, which has a cooling system, allows the mixture to be cooled down to around 22-23° C., and then the As(III) measurement is carried out in the same way as described above.

The invention is now illustrated by the following example.

Example 1: Implementation of the Method of the Invention to Clean Electrodes in a Microfluidic Circuit for Detecting Arsenic in Water A microfluidic circuit such as described in FIG. 1 was used, the main microchannel 69 thereof containing three electrodes:
  a working electrode in gold;
  a reference electrode in platinum; and
  a counter-electrode in platinum.

The cleaning and regeneration method of the invention was carried out and comprised steps N1 to N4 and cleaning with nitric acid.

The control solutions were measured over 280 arsenic detection operations, and the electrochemical signal showed no peak due to traces of arsenic. These 280 analyses corresponded to analyses performed over 4 months using the same microfluidic chip. In the range of potential (−0.2 to 0.6 V relative to a platinum reference electrode) for arsenic signal onset, no peak was observed translating the presence of arsenic.

The method of the invention is therefore most efficient, the more so since glass is known to adsorb MTEs.

The invention claimed is:

1. A microfluidic method for cleaning and/or regenerating at least one microfluidic sensor comprising at least one microfluidic sensor, at least one glass microchannel forming a microfluidic circuit and at least two electrodes, wherein one of the at least two electrodes is at least a gold working electrode comprising at least the following steps:
  a step N) to clean the microfluidic circuit, comprising the four following sub-steps:
    N1: a sub-step to clean the microfluidic circuit, comprising an injection and circulation of a fluid sample in the at least one microchannel;
    N2: a sub-step to clean the at least the gold working electrode of the at least two electrodes, sub-step N2 comprising a use of sulfuric acid in the at least one microchannel to clean the at least the gold working electrode of the at least two electrodes by cyclic voltammetry, and comprising measurement of an active surface of the at least the gold working electrode of the at least two electrodes to verify that said active surface still remains equal to a target value of +/−10%;

N3: a gold deposition sub-step on the at least the gold working electrode via electrochemical route using as reagents a mixture of tetrachloroauric acid and sulfuric acid; and N4: a control sub-step, by measuring a control solution; and a second step to clean the microfluidic circuit, comprising at least a circulation of a nitric acid solution in the at least one microchannel.

2. The method according to claim 1, wherein the at least one glass microchannel is fluidly connected:

to a first end, to an inlet and to at least one reservoir for nitric acid; and to a second end, to at least two reservoirs for reagents to regenerate the at least the gold working electrode of the at least two electrodes.

3. The method according to claim 1, wherein the at least one microfluidic sensor comprises at least three electrodes which are:

the at least the gold working electrode;

a reference electrode in platinum; and a counter electrode in platinum.

4. The method according to claim 1, wherein the gold deposition sub-step N3 comprises the deposition of at least one conductive or semiconductive layer on the at least the gold working electrode of the at least two electrodes, when the active surface of the at least the gold working electrode is lower than the target value, wherein a material of the at least one conductive or semiconductive layer is a gold material.

5. The method according to claim 1, wherein the sub-step N2 to clean the at least the gold working electrode of the at least two electrodes comprises cleaning the at least the gold working electrode by injection and circulation of the sulfuric acid in the at least one microchannel; and wherein the gold deposition sub-step N3 comprises depositing gold on the gold working electrode via the electrochemical route, with the mixture of tetrachloroauric acid and sulfuric acid.

6. The method according to claim 1, wherein the step to clean the microfluidic circuit comprises a step to store the circuit in a reservoir containing nitric acid.

\* \* \* \* \*